Aug. 9, 1960  D. E. TOMKINS  2,948,301
MODULAR CIRCULAR SEGMENT STRUCTURE
Filed July 28, 1958

INVENTOR.
DAVID E. TOMKINS
BY Ely, Pearne & Gordon
ATTORNEYS

United States Patent Office
2,948,301
Patented Aug. 9, 1960

2,948,301
MODULAR CIRCULAR SEGMENT STRUCTURE
David E. Tomkins, New Castle, Pa., assignor to Shenango China, Inc., New Castle, Pa., a corporation of Pennsylvania
Filed July 28, 1958, Ser. No. 751,497
3 Claims. (Cl. 138—81)

This invention relates to cast or molded circular segment structure and particularly to segments or slabs which are adapted to be made up into modular rings of masonry, plastic or refractory materials or other materials adapted to be cast or molded. The rings may in turn be adapted to be stacked to furnish modular structure of increased height.

A particular advantage of the invention is the simplicity of the forms contemplated. The forms are so made that they may be cast or molded in straight-sided mold cavities as for example by simply placing a block of uncured cement mix, plastic, or refractory material within the mold cavity, closing a mold die thereon and compression molding the component. At the same time, the component interlocks with others of its kind in a modular manner so that when it is confined in a circular shape, the edges of the several components interlock to function as conventional tongue-and-groove or ship-lap joints.

The above and other objects and advantages of the invention will be more fully understood from the following description of one embodiment of the invention.

Figure 1:
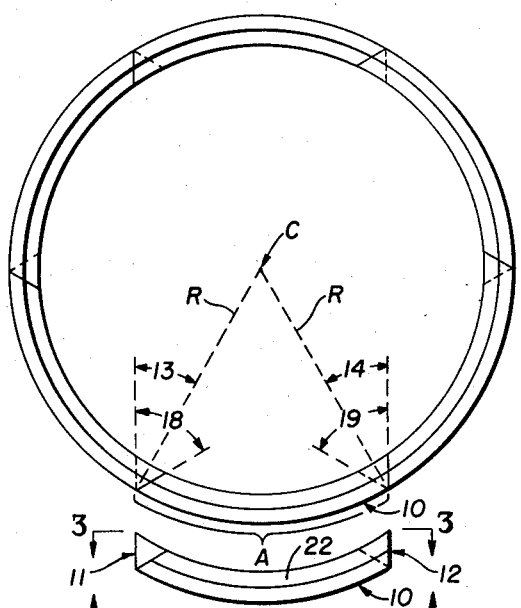
Figure 2:
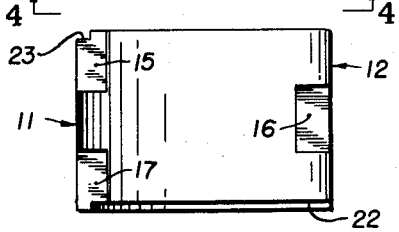
Figure 3:
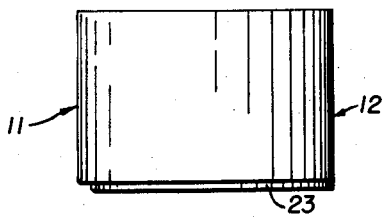
Figure 4:
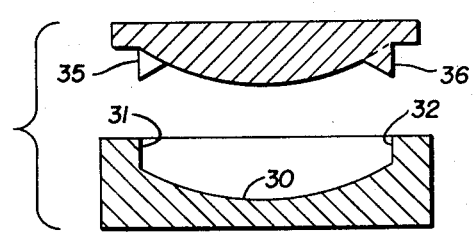
Figure 5:
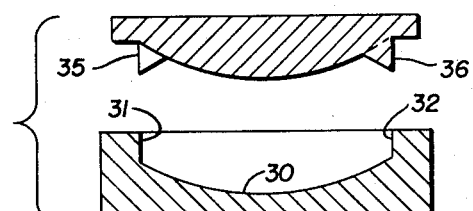

In the accompanying drawings:
Figure 1 is an edge-on view of a ring or assemblage of components contemplated by the invention.
Figure 2 is a similar view of a single component.
Figure 3 is a view taken from the plane of line 3—3 in Figure 2.
Figure 4 is a view taken from the plane of line 4—4 in Figure 2.
Figure 5 is a schematic illustration of a mold die and cavity which could be used in the manufacture of the illustrated component.

The ring shown in Figure 1 will be seen to comprise a number of components including the component generally indicated by the reference numeral 10. The component (as well as each of the others) may be regarded as extending along the arc A of an imaginary circle having the center C. The arc subtends an angle evenly divisible into 360°. In the illustrated case, the angle is 60°. The component or slab 10 has a first notched edge face 11 and a second notched edge face 12.

The edge faces 11 and 12 are parallel to each other. As is apparent in Fig. 1, faces 11 and 12 also are parallel to the radius of the slab at its center, that is, the radius bisecting the arc subtended by the slab. The angles between each of the edge faces and the radius R from its radially outer edge to the center C of the imaginary circle is equal to half the angle subtended by the arc A; in the illustrated case, it is equal to 30°. The faces 11 and 12 are provided with notches which alternate back and forth between the faces along the axial length of the component or slab 10. Thus, in the illustrated case, the face 11 has two notches 15 and 17 and the face 12 has a single notch 16. The notches 15—17 will be seen to alternate back and forth between the faces 11 and 12 along the axial length of the slab and the extent of these notches along the axial length of the slab will be seen to be such that the notches just overlap each other, whereby the parts associated with adjoining faces 11 and 12 of adjoining slabs 10 will dovetail with each other in the assembled condition shown in Figure 1. To this end also, the notches 15—17 have bottom faces (to which the lead lines of reference numerals 15—17 are applied in Figure 3) which are at angles to their associated edge faces 11 or 12, which angles are respectively numbered 18 and 19. The angles 18 and 19 are bisected by the associated radii R. Such angles are equal to the angle subtended by the arc A. Thus in the illustrated example, the angles 18 and 19 will be seen to be equal to 60° and are bisected by the radii R. A plurality of the above-described slabs, each having its end faces 11 and 12 parallel to the radius of the slab drawn to its center, and the angle between the end faces and the faces of notches 15—17 equal to 360° divided by the total number of slabs, may be quickly and easily assembled into a circular form by simply sliding the individual slabs toward point C. Such construction eliminates the difficult and time-consuming procedure of lifting each slab above the circular form and wedging it downwardly into place as is the present practice in forming rings of the type described.

Each slab 10 may be also provided with a first inner edge notch 22 and a second outer edge notch 23. These edge notches are at opposite ends of the axial extent of the slab 10. When a ring is assembled, as in Figure 1, another similar ring can be stacked on top of it with the respective edge notches 22 and 23 associated with the two stacked rings serving to interlock them against axial misalignment.

Cables or straps (not shown) may encircle the assembled ring or rings to restrain them against radially outward movement from their assembled position and, as for example in structures used as storage silos, to resist in tension the pressures imposed by the contents of the structure. In other structures the assembled ring or rings may be held together by other means such as for example by mortar or cement or the like or by fasteners such as bolts or rivets or the like.

The schematic illustration of Figure 5 shows how the slab 10 may be simply formed. In this showing the ridges in the die cavity and in the mold die necessary to form the notches 22 and 23 are eliminated for purposes of clarity. The sides 31 and 32 of the mold cavity 30 will be seen to be straight. The edge face 11 is defined by the straight mold wall 31 and the edge face 12 is defined by the straight mold wall 32. The notches 15—17 are formed by the projections 35—37 respectively (only two of which, 35 and 36, are seen in Figure 5 inasmuch as this figure illustrates the mold through a section exactly half way through the axial extent of the mold cavity).

Many alternatives to the specific embodiment disclosed above are possible. Accordingly, the scope of the invention is not to be restricted to the details of the illustrated embodiment but is to be defined by the scope of the following claims.

What is claimed is:
1. A structure comprising a plurality of slabs arranged in a circle to constitute a cylinder having said circle on its periphery, each slab extending along an arc of said circle and having first and second edge faces intersecting said circle at the ends of said arc, said arc subtending an angle evenly divisible into 360°, said first and second edge faces having notches formed therein and said faces being parallel to each other and to the radius of said slab drawn to its center, the angle between each of said faces and the radius from its intersection with said circle to the center of said circle being equal to half the angle subtended by said arc, the notches in said faces alternating back and forth between the faces along the axial direction of said cylinder, said notches having bottom faces which are at angles to their associated slab edge faces, said last named angles being bisected by the associated ones of said radii and being equal to the angle subtended by said arc.

2. A structural component comprising a slab extending along the arc of an imaginary circle and having first and second edge faces intersecting the imaginary circle at the ends of said arc, said arc subtending an angle evenly divisible into 360°, said first and second edge faces having notches formed therein and said faces being parallel to each other and to the radius of said slab drawn to its center, the angle between each of said faces and the radius from its intersection with the imaginary circle to the center of the imaginary circle being equal to half the angle subtended by said arc, the notches in said faces alternating back and forth between the faces along the axial length of the slab, said notches having bottom faces which are at angles to their associated slab edge faces, said last named angles being bisected by the associated ones of said radii and being equal to the angle subtended by said arc.

3. A circular structure comprising a plurality of arcuate slabs, each of said slabs having opposite and staggered end faces, said end faces being parallel to the radius of the slab drawn to its center, notches in said slab interposed between said end faces, said notches having bottom faces which are at an angle to the adjacent end faces, said notch faces being on the inner surface of said slab and the angle between the notch faces and adjacent end faces being equal to the arc subtended by each arcuate slab.

References Cited in the file of this patent
UNITED STATES PATENTS

| | | |
|---|---|---|
| 86,796 | Absterdam | Feb. 9, 1869 |
| 535,497 | Herth | Mar. 12, 1895 |
| 912,428 | Slocomb | Feb. 16, 1909 |
| 1,665,442 | Campbell | Apr. 10, 1928 |
| 1,732,056 | Lesher | Oct. 15, 1929 |
| 1,795,451 | Sharpe | Mar. 10, 1931 |